(12) United States Patent
Kurata et al.

(10) Patent No.: US 8,540,649 B2
(45) Date of Patent: Sep. 24, 2013

(54) BODY-REGION SEPARATELY WEIGHING SYSTEM AND METHODS

(76) Inventors: Tadao Kurata, Tokyo (JP); Sumiko Kurata, Tokyo (JP)

( * ) Notice: Subject to any disclaimer, the term of this patent is extended or adjusted under 35 U.S.C. 154(b) by 772 days.

(21) Appl. No.: 12/223,875

(22) PCT Filed: Oct. 16, 2006

(86) PCT No.: PCT/JP2006/320568
§ 371 (c)(1),
(2), (4) Date: Jun. 4, 2010

(87) PCT Pub. No.: WO2007/094099
PCT Pub. Date: Aug. 23, 2007

(65) Prior Publication Data
US 2010/0263941 A1    Oct. 21, 2010

(30) Foreign Application Priority Data

Feb. 13, 2006  (JP) ................................. 2006-035544

(51) Int. Cl.
*G01G 19/44* (2006.01)
*G01G 19/46* (2006.01)
*G01G 19/50* (2006.01)
*A61B 5/103* (2006.01)

(52) U.S. Cl.
USPC ........ 600/587; 177/25.13; 177/199; 177/200; 177/245

(58) Field of Classification Search
USPC ............... 177/1, 25.13, 25.16, 199, 200, 245; 600/547, 587
See application file for complete search history.

(56) References Cited

U.S. PATENT DOCUMENTS

| 2,653,475 | A | * | 9/1953 | Kraus ............................. 73/172 |
| 5,086,856 | A | * | 2/1992 | Haggstrom .................... 177/161 |
| 5,285,022 | A | * | 2/1994 | Antone .......................... 177/253 |
| 5,414,225 | A | * | 5/1995 | Garfinkle ...................... 177/199 |

(Continued)

FOREIGN PATENT DOCUMENTS

| JP | 61-18684 | 5/1986 |
| JP | 2001-141511 | 5/2001 |
| JP | 2001-321350 | 11/2001 |
| JP | 2002-048631 | 2/2002 |

OTHER PUBLICATIONS

USPTO Translation of JP61-018684. May 24, 2013.*

(Continued)

*Primary Examiner* — Randy W Gibson
(74) *Attorney, Agent, or Firm* — Nixon & Vanderhye P.C.

(57) ABSTRACT

[PROBLEMS] To provide a system and a method for accurately measuring the weight of a portion of a human body.
[MEANS FOR SOLVING THE PROBLEMS] This system for measuring the weight of each of six body portions of a human body comprises support base provided for six body portions and supporting the body portions, six body portion measuring units each having a weight measuring part measuring the weight of the body portion and a data transmission-reception part transmitting and receiving data including data on the weight of the body portion measured by the weight measuring part, and a data processing unit transmitting control data to the six body portion measuring units and receiving the data on the measured weights of the body portions. The data processing unit comprises a means determining whether or not the total sum of the data on the measured weights of the six body portions matches the weight of the human body within a present allowable range.

2 Claims, 5 Drawing Sheets

(56) References Cited

U.S. PATENT DOCUMENTS

6,369,337 B1 * 4/2002 Machiyama et al. ...... 177/25.13
6,565,519 B2 * 5/2003 Benesh .......................... 600/587
6,875,932 B2 * 4/2005 Tuft ............................ 177/25.13
7,399,933 B2 * 7/2008 Bianco .......................... 177/150

2012/0330610 A1 * 12/2012 Kurata et al. ................. 702/173

OTHER PUBLICATIONS

International Search Report for PCT/JP2006/320568, mailed Nov. 1, 2006.

* cited by examiner

BODY-REGION SEPARATELY WEIGHING SYSTEM AND METHODS

This application is the U.S. national phase of International Application No. PCT/JP2006/320568, filed 16 Oct. 2006, which designated the U.S. and claims priority to Japan Application No. 2006-035544, filed 13 Feb. 2006, the entire contents of each of which are hereby incorporated by reference.

BACKGROUND OF THE INVENTION

1. Field of the Invention

The present invention relates to a body-region separately weighing system and a method conducted using the same which weigh each of six separate body regions of the head, trunk, right and left arms and right and left legs of a human body.

2. Description of the Background Art

It is essential that a person should weigh himself or herself to thereby become aware of whether the person is in good health. A person usually weighs himself or herself with standing on a weighing machine, for example, given by Japanese Patent Laid-Open Publication No. 2001-141511 and Japanese Patent Laid-Open Publication No. 2002-48631. Conventionally, the body weight was measured by a so-called platform machine and has recently been taken by various electronic and digital weighing machines on the market. A variety of sensors (a distortion gauge, an electrostatic capacity sensor and a piezo-electric sensor) indispensable for reliable weighing have also been developed including a precision tuning-fork sensor. Such a sensor detects a physical or mechanical variation in the load of body weight and converts it into an electric signal, and a computer acquires the electric signal outputted by the sensor, reduces it to a body weight through a data processing and displays it on a screen or analyses it diversely.

From the viewpoint of lifestyle-related disease prevention or the like, so-called obesity prevention is crucial, thereby requiring information on body weight, as well as body fat quantity, particularly, visceral fat quantity or the like concentrating in the trunk. In addition to the trunk, in order to prevent osteoporosis, it is necessary to become aware of the bone mineral density or bone quantity of both arms, both legs or the like. The body fat quantity or the bone quantity can be obtained by measuring the weight and volume of each region of a human body to grasp the density of each region.

Conventionally, health was checked or managed, for example, using a BMI or another health index, without distinguishing persons having the same body weight by the thickness of the limbs, or without distinguishing persons clearly by the location of a body fat, the viscera or the legs, or by such another.

In addition, health or nutrition instructions were given without clarifying gains in the weight of the head, trunk, both arms, both legs and another region of a child as growing from infant to youth. Besides, how well a person can develop limb muscles through sports training, how much an aged person has lost limb muscles, how serious osteoporosis is, or such another, was extremely vaguely evaluated merely using the weight of the whole body.

Conventionally, Japanese Patent Laid-Open Publication No. 2001-321350 offers an art of measuring the quantity of some substance in each body region using bioelectric impedance. This measurement is conducted by measuring a potential difference and an electric current between predetermined regions of a subject and calculating a bioelectric impedance to thereby obtain the fat weight, weight other than the fat, water content, cell-fluid weight or the like of each body region.

In the conventional body-region separately measuring method conducted using bioelectric impedance, however, a considerable error can be produced depending upon the body condition of a subject at the time of measurement, thereby hindering obtaining measured values reliable enough to give nutrition instructions, and especially in the weight of each body region, only acquiring estimates. Accordingly, a body-region separately weighing system and a method for the same capable of meeting the above health-management demand are not yet disclosed.

SUMMARY OF THE INVENTION

In view of the present situation, it is an object of the present invention to provide a system and a method capable of weighing each body region of a person accurately by utilizing a conventional weighing-machine art of measuring the weight of the whole body.

In order to accomplish the object, the present invention presents the following configurations.

(1) A body-region separately weighing system according to claim 1 which weighs each of six body regions of the head, trunk, right arm, left arm, right leg and left leg of a human body, includes: six body-region measuring units each provided for each of the six body regions and including a supporter supporting each body region, a weighing portion weighing each body region on the supporter and a data transmitting-receiving portion transmitting and receiving data including body-region weight data measured by the weighing portion; and a data processing unit transmitting control data for weighing each body region and receiving the measured body-region weight data to and from each of the six body-region measuring units, in which the data processing unit includes a means for deciding whether the difference between the total of the measured body-region weight data of each of the six body regions and the weight of the human body is within a predetermined tolerance.

(2) A body-region separately weighing system in which each body-region measuring unit further includes a height adjustment portion adjusting the height of the supporter and a horizontal adjustment portion adjusting the position of the supporter in the horizontal directions.

(3) A body-region separately weighing method which includes the steps of: weighing the human body using any one of the six body-region measuring units; supporting each body region using the supporter and weighing each body region using the weighing portion in each of the six body-region measuring units, and acquiring the measured body-region weight data using the data processing unit; calculating the total of the measured body-region weight data of each of the six body regions; deciding whether the total of the measured body-region weight data coincides within the predetermined tolerance with the weight of the human body; and determining that the measured body-region weight data is each weight of the six body regions if the total is within the predetermined tolerance.

(4) A body-region separately weighing system which weighs each of a plurality of body regions of a human body, includes: a plurality of body-region measuring units each provided for each of the plurality of body regions and including a supporter supporting each body region, a weighing portion weighing each body region on the supporter and a data transmitting-receiving portion transmitting and receiving data including body-region weight data measured by the weighing portion; and a data processing unit transmitting control data for weighing each body region and receiving the measured body-region weight data to and from each of the plurality of body-region measuring units, in which the data processing unit includes a means for deciding whether the difference between the total of the measured body-region weight data of each of the plurality of body regions and the weight of the human body is within a predetermined tolerance.

(5) A body-region separately weighing system which weighs each of six body regions of the head, trunk, right arm, left arm, right leg and left leg of a human body, includes six body-region measuring units each provided for each of the six body regions and including a weighing portion weighing each body region.

The body-region separately weighing system and method according to the present invention are capable of accurately weighing each of the six main body regions of a person, thereby offer precise data on the weight of each body region which cannot naturally be completely separated from another joined region (e.g., the trunk) and thus individually weighed irrelevantly. According to the present invention, if the total of each measured body-region weight of a person in a supine or prone posture coincides within a predetermined tolerance with the weight of the whole body, each measured value is considered definitely to be the weight of each body region. The thus defined body-region weights are each a fixed value regardless of the body condition of a subject at the time of measurement and ascertained to be data effectively usable for diverse analyses or the like.

Therefore, the present invention is expected to be extremely useful for individual health management from infants to the aged.

The present invention is helpful, for example: in confirming how well a child has grown, using variations in the head-region weight and the body weight caused by extremely rapid development of the brains from an infant to a little child; in anticipating a fall in exercise ability, a deterioration in osteoporosis or the like, using variations in the weight of both arms or both legs or the like of an aged person as the person gets older; of course in verifying how effective a specified sports training or diet is; in ascertaining how well an expected baby of a pregnant woman is growing up; in nursing or medical treatment; and the like.

In the body-region separately weighing system according to the present invention, the weight of each body region acquired thereby provides data necessary for measuring the density of each body region, and further, is used together with a body fat quantity, a body fat percentage or the like acquired by bioelectric impedance measurement currently in wide use, thereby remarkably contributing toward keeping and managing the health of people.

DESCRIPTION OF THE PREFERRED EMBODIMENTS

Figure 1:
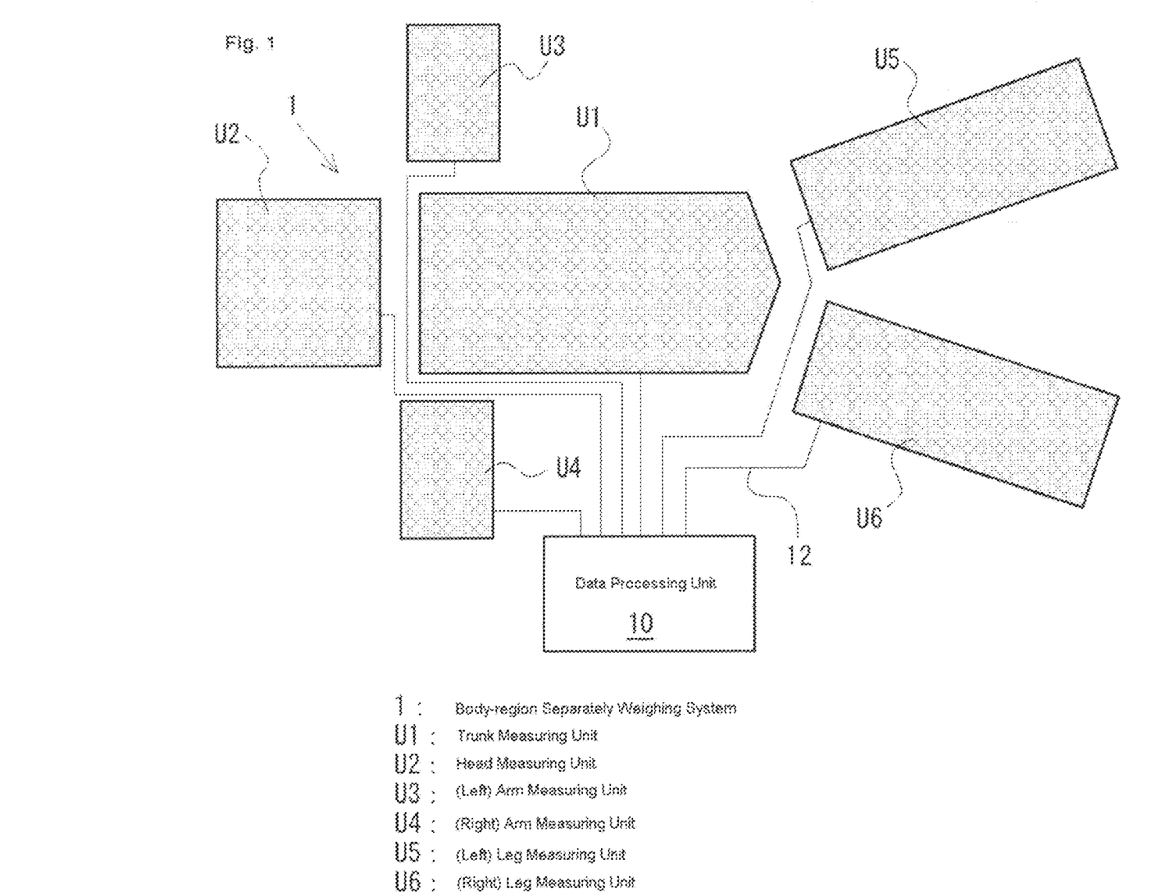
FIG. 1 is a schematic top view showing the whole configuration of a body-region separately weighing system according to the present invention.

FIG. 1 is a schematic top view showing the whole configuration of a body-region separately weighing system 1 according to the present invention. The system 1 weighs the six major body regions of a human body separately: the head, trunk (body including the chest, abdomen and loins), right and left arms (including the hands), right and left legs (including the feet).

FIG. 1 shows a typical example (in top view) of the arrangement of six body-region measuring units U1 to U6 for weighing each of the six body regions of a subject basically in a supine or prone posture. Around the trunk measuring unit U1 generally having a rectangular outline are arranged the head measuring unit U2 on one side in the longitudinal directions, the left-leg and right-leg measuring units U5 and U6 on the other side and the left-arm and right-arm measuring units U3 and U4 on each side of the trunk measuring unit U1 in the lateral directions.

The left-arm and right-arm measuring units U3 and U4 lie in positions horizontally extending from the shoulders of the subject, and in order to obtain the best measurement results, are movable to adjust the angle of each arm to the trunk, the distance from the trunk or the like suitably according to the build of the subject. In the same way, the left-leg and right-leg measuring units U5 and U6 can be optimally positioned by adjusting the angle of one to the other, the distance from the trunk or the like according to the build of the subject.

The body-region measuring units U1 to U6 of FIG. 1 each preferably have an outline suitable for supporting a body region corresponding thereto, in other words, an outline similar to each corresponding body region. However, their outlines are not limited to such specific ones, unless they hinder taking measurements.

The body-region measuring units U1 to U6 each conduct data communication with a data processing unit 10 through a wired or radio data transmission line 12. The data processing unit 10 is a computer having data processing software according to the present invention, includes a CPU and a memory and allows the CPU to execute the software read in the memory, thereby realizing a data processing function according to the present invention. It also includes a storage unit, a display unit and an operation input unit suitable for the data processing.

Figure 2:
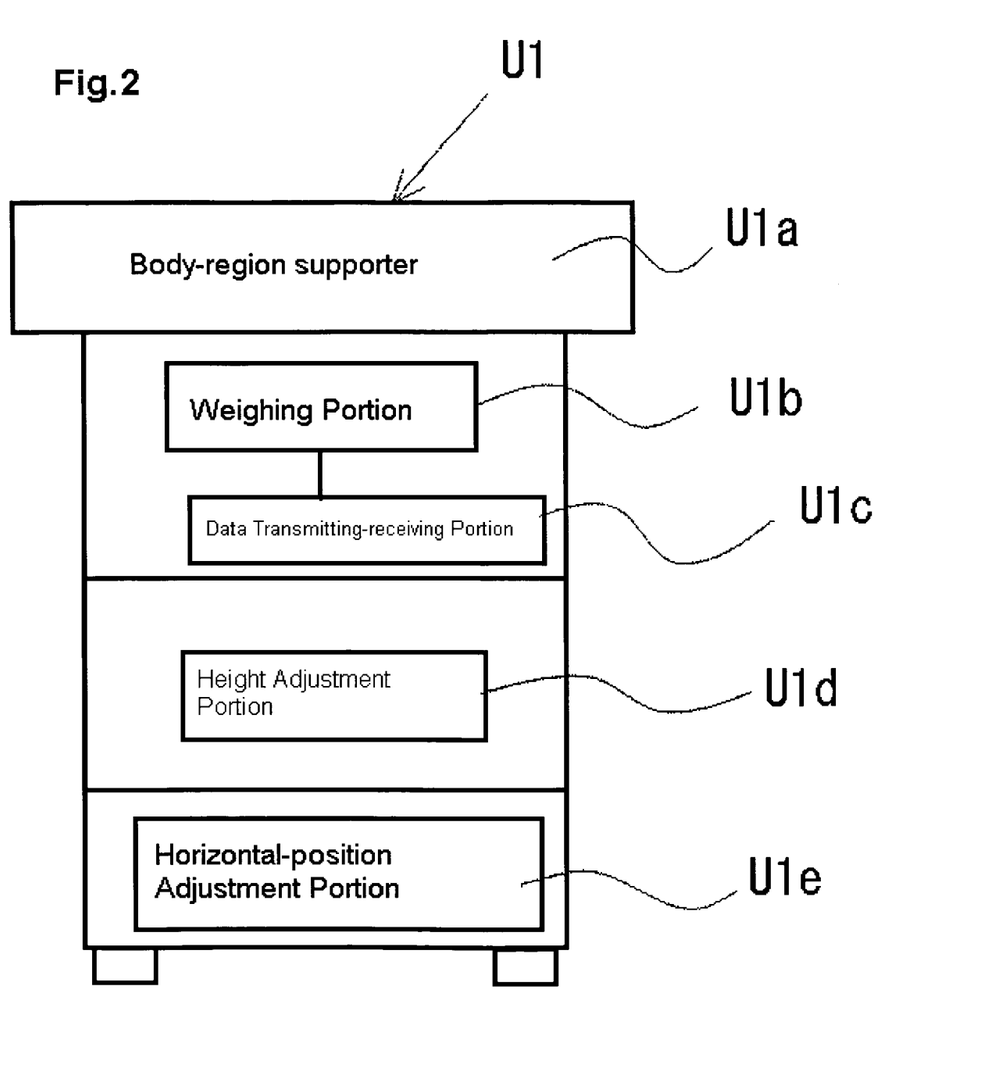
FIG. 2 is a schematic side view showing an example of the internal configuration of a trunk measuring unit U1.

FIG. 2 is a schematic side view showing an example of the internal configuration of the trunk measuring unit U1 including from above, a body-region supporter U1a, a weighing portion U1b (provided with a data transmitting-receiving portion U1c), a height adjustment portion U1d and horizontal-position adjustment portion U1e.

The uppermost body-region supporter U1a includes a flat support surface for supporting the trunk in contact and has a mechanical strength and an area great enough to support the trunk around the center of gravity thereof and a shape suitable for measuring the trunk.

The weighing portion U1b right below the body-region supporter U1a is faithfully sent a load borne on the body-region supporter U1a. The weighing portion U1b may basically have any structure of a well-known weighing machine, for example, a load measuring function using a pressure sensor (such as an electrostatic capacity sensor, a semiconductor sensor, a piezo-electric sensor and a tuning-fork sensor) or the like. It is also provided with the data transmitting-receiving portion U1c transmitting output data (electric signal) of the sensor to the data processing unit shown in FIG. 1 and receiving a control signal or the like from the data processing unit.

The height adjustment portion U1d between the weighing portion U1b and the horizontal-position adjustment portion U1e has the function of adjusting the height of the flat support surface of the body-region supporter U1a from the floor, for example, a well-known mechanism for sending a control signal to a motor driving means for moving the flat support surface vertically to thereby control the movement distance. The motor-drive control signal can be transmitted from the data processing unit of FIG. 1. The flat support surface is usually easy to use at a height of approximately 20 to 50 cm (mean value: 35 cm) from the horizontal floor, though it depends upon the stature of the subject. Hence, the flat support surface is standardized to, for example, a height of about 35 cm from the floor, and the height adjustment portion U1d has an adjustable range of ±15 cm.

The lowermost horizontal-position adjustment portion U1e has the function of making a fairly large horizontal motion when the system 1 is installed or when the subject is fixed in an initial position and making a fine adjustment of the horizontal position when a body region is weighed. The fairly large horizontal motion is made, for example, using rollers (including a stopper) attached to the bottom. The fine horizontal-position adjustment is made, for example, using a console movable two-dimensionally on the horizontal plane by motor driving which is provided with the upper component elements U1a to U1d thereon. A control signal for this motor driving can also be transmitted from the data processing unit of FIG. 1. Specifically, a measuring unit can be moved in line with measurement requirements for each body region, for example, the length of the arms or the like, and fixed in an optimum position by the stopper.

The other body-region measuring units U2 to U6 each basically have a configuration common to the body-region measuring unit U1, and thus, their description is omitted.

Under regular usage conditions, the five body-region measuring units U2 to U6 for the head, both arms and both legs around the trunk are united and used with the central body-region measuring unit U1. If necessary, however, they can be separated from each other and used independently.

The system 1 allows the data processing unit 10 to instantly input each sensor output signal (weight information) from the body-region measuring units U1 to U6 supporting each body region of the subject, execute a data processing and output a measurement result. As described earlier, a load can be measured by changing the height of the flat support surface for supporting each body region from the floor within a specified range, thereby verifying and correcting a measured value of each body-region weight. Besides, a decision can regularly be made whether the total weight of each body region is equal to the weight of the whole body, thereby making each body-region weight more reliable.

Figure 3:
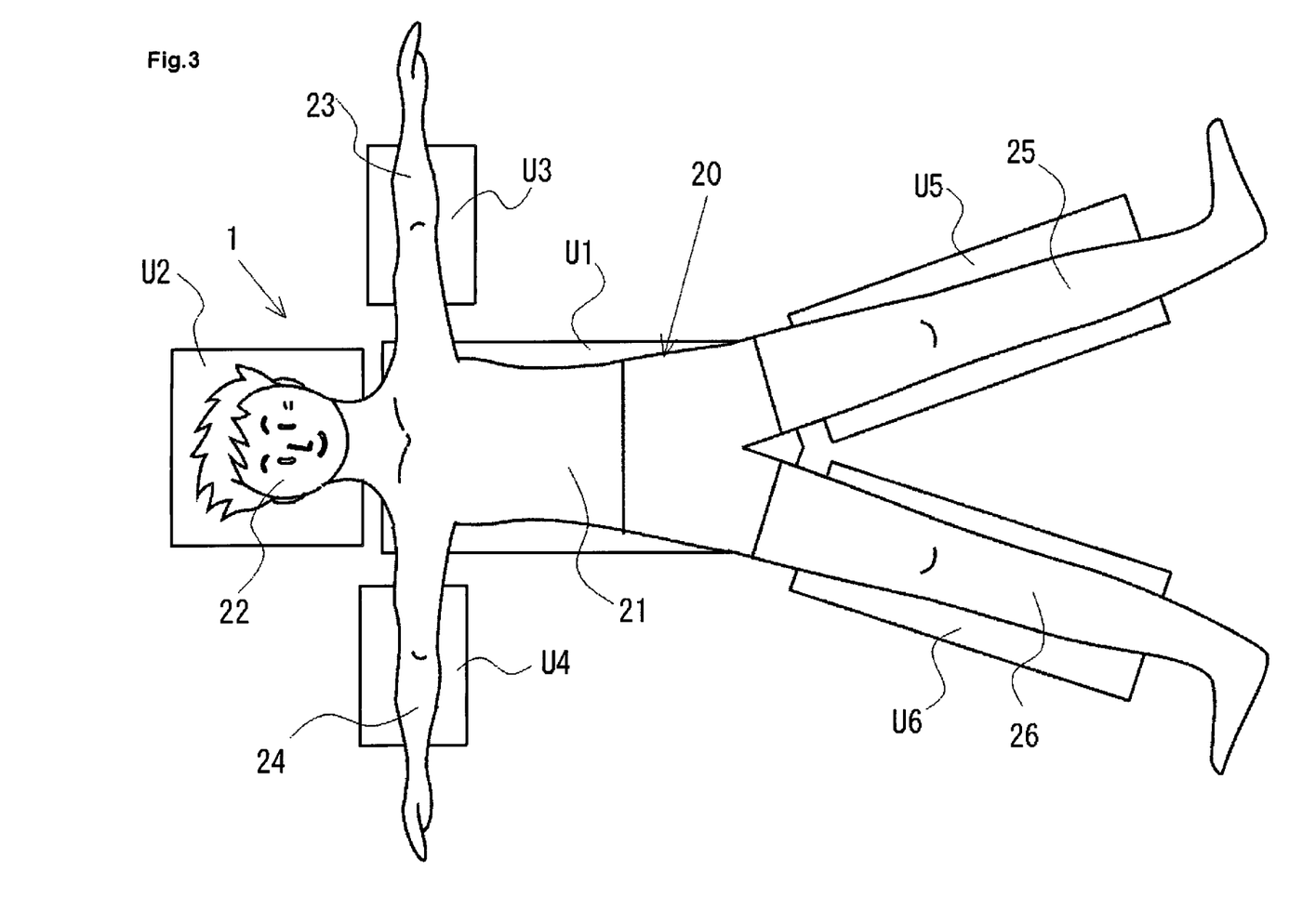
FIG. 3 is a top view showing the system weighing each body region of a subject.

FIG. 3 is a top view showing the system 1 weighing each body region of a subject.

If the flat support surface of each measuring unit supporting the six body regions is in contact all on the same (horizontal) plane with each body region, in other words, if they support the whole body simultaneously on the same plane including the six contact surfaces (having the center of gravity), then each measured value and the total thereof are obviously expected to be each body-region weight and the whole body weight, respectively. This is because the weight vector of each body region is exactly perpendicular to the horizontal plane and crosses substantially at right angles to the plane including the body axis, in other words, various mechanical vectors toward the connection directions of the trunk and each body region, thereby minimizing the influence on the weight measurement.

In FIG. 3, a trunk 21 and a head 22 can be easily supported around the center of gravity thereof at a support point equivalent to the contact point with each body region on the body-region support part (flat support surface) of each measuring unit U2 to U6. To the contrary, both arms 23, 24 and both legs 25, 26 have joints, thereby supporting the joints and the vicinities thereof as the support point.

In order to separately weigh each body region more precisely, alternatively, it may be appreciated that both arms 23, 24 and both legs 25, 26 are each divided into two regions at the elbow and the knee as the joint, respectively, to measure each of the two regions individually. In short, the ten body regions are each weighed separately, thereby requiring ten body-region measuring units in total including two additional ones (four in total) for both arms and both legs, respectively. In this case, without employing the joint as the gravity-center vicinity (i.e., support point) of each such region and including the joints from the regions to be measured, the so-called upper arms, forearms, thighs and shanks are each measured by supporting the gravity-center vicinity thereof.

In contrast, a system may be provided, if necessary, which includes fewer body-region measuring units than those of the system 1 shown in FIGS. 1 to 3. For example, if a single measuring unit measures both legs, five body-region measuring units weigh each of the five body regions (head, trunk, right arm, left arm and both legs as one). Further, for example, if one measuring unit measures both arms and the trunk, four body-region measuring units weigh each of the four body regions (head, trunk and both arms as a unit, right leg and left leg). Still further, for example, if one measuring unit measures both arms and the trunk and another measuring unit measures both legs, three body-region measuring units weigh each of the three body regions (head, trunk and both arms as one and both legs as one).

In this way, the body-region separately weighing system according to the present invention is not limited to weighing each body region divided into six, and more generally, can be employed as a system weighing each of a plurality of (e.g., two to ten) body regions separately.

In addition, it may be appreciated that the measurement can be fully automated (including the height and horizontal-position adjustment of each measuring unit) under the control of the data processing unit. Besides, the entire weighing system becomes transportable by making each body-region measuring unit smaller and lighter.

Figure 4A:
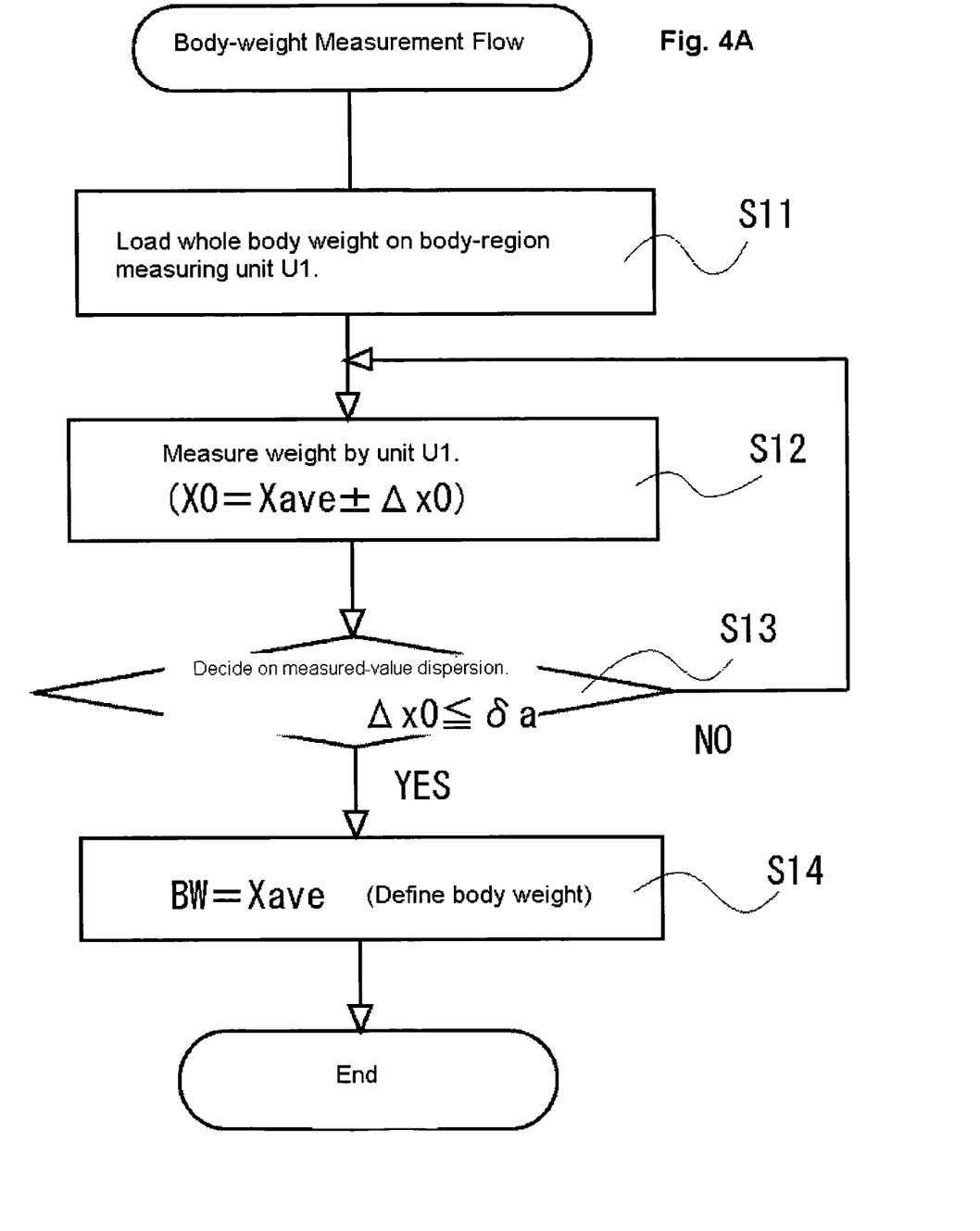
FIG. 4A is a flow chart showing measurement of the weight of a person.
Figure 4B:
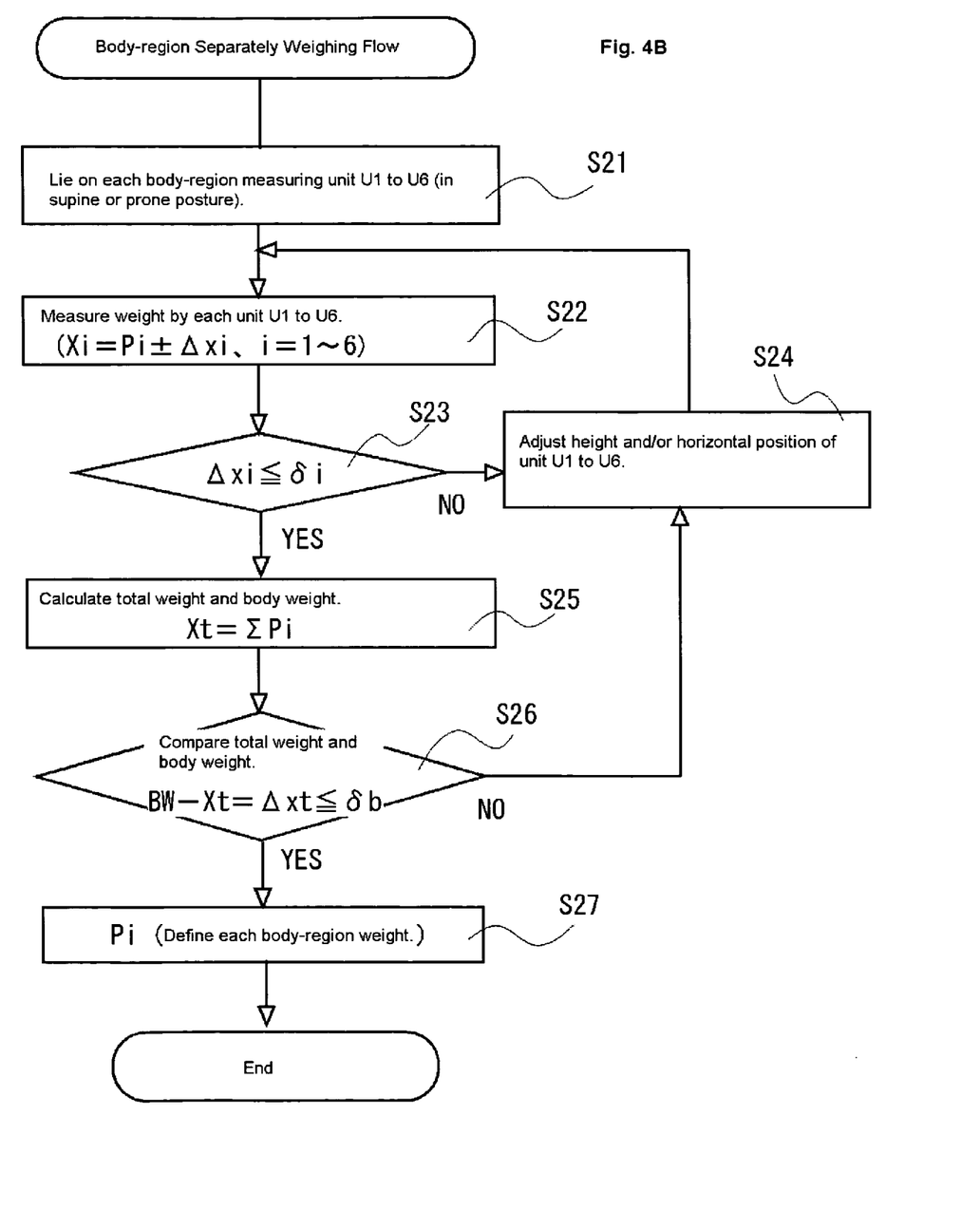
FIG. 4B is a flow chart showing measurement of the weight of each body region of the person.

FIGS. 4A and 4B are each a schematic flow chart showing an example of the body-region separately weighing conducted using the body-region separately weighing system shown in FIGS. 1 to 3. Through the body-region separately weighing flow, each body region is weighed using the weight of a whole body measured at an earlier stage.

FIG. 4A shows the whole-body weighing flow, and the body weight is measured using any body-region measuring unit, preferably, the body-region measuring unit U1 arranged in the center in FIG. 1.

Step S11: A subject first lies on the back with as lightly dressed as possible on the six body-region measuring units and raises and keeps the head, both arms and both legs slightly above the horizontal level, thereby making ready for weighing the body with the whole body weight loaded on the body-region measuring unit U1. The body-weight data obtained by the body-region measuring unit U1 is stored in a suitable storage unit of the data processing unit 10. Alternatively, the subject may sit or stand on the body-region measuring unit U1 to thereby keep the entire body weight loaded thereon.

Step S12: The body-weight measurement is repeated a predetermined number of times to thereby acquire a plurality of measured values X0 and calculate the average value Xave thereof and a dispersion or a fluctuation width (±Δx0).

Step S13: A decision is made whether the fluctuation width Δx0 of the plurality of measured values X0 is equal to or below a predetermined tolerance δ a. If the fluctuation width Δx0 is above the tolerance δ a, the processing returns to the step S12 to repeat the body weighing the predetermined number of times again. The tolerance δ a can be, for example, 50 grams because a precise weighing machine with a scale up to 100 kg currently on the market is generally graduated in a minimum of 50 grams, thereby enabling each body-region measuring unit of the system according to the present invention to measure a weight with such a high precision.

Step S14: If the fluctuation width Δx0 is within the tolerance δ a, the average value Xave is defined as the measured value of a body weight BW and stored in the storage unit, and the body-weight measurement comes to an end.

Next, a description will be given about the body-region separately weighing flow shown in FIG. 4B.

Step S21: The subject first lies on the back (or on the face) with as lightly dressed as possible on the six body-region measuring units and puts each body region on the supporter of the corresponding body-region measuring unit.

Step S22: Each body-region measuring unit U1 to U6 weighs the corresponding weight and acquires a measured weight data Xi (i=1 to 6) to be transferred to the data processing unit 10. Each body-region measuring unit U1 to U6 repeats the weight measurement a predetermined number of times to thereby acquire a plurality of values Xi measured by each unit and calculate the average value Pi thereof and a dispersion or a fluctuation width (±Δxi).

Step S23: A decision is made whether the fluctuation width Δxi of the plurality of measured values Xi is equal to or below a predetermined tolerance δ i. If the fluctuation width Δxi is above the tolerance δ i, the processing for the corresponding body region returns to the step S22 to repeat the weighing the predetermined number of times again. The tolerance δ i can be, for example, 50 grams for the same reason as the above δ a. If the fluctuation width Δxi is within the tolerance δ i, the average measured value Pi is temporarily set as the weight of the corresponding body region and stored in the storage unit.

Step S24: If the fluctuation width Δxi is above the tolerance δ i, then in the corresponding body region, the processing returns to the step S22 to repeat the weighing the predetermined number of times again after adjusting the height or horizontal position of the corresponding body-region measuring unit U1 to U6. The body-region measuring unit U1 to U6 subjected to such an adjustment is not limited to the one which has measured the great fluctuation width Δxi, and one or more other body-region measuring units may undergo a height and/or horizontal-position adjustment. After the adjustments, the processing returns again to the step S22 and repeats the weight measurement to thereby set the weight Pi of each body region temporarily.

Step S25: A calculation is made of the total Xt of the weight Pi (i=1 to 6) of each body region set temporarily at the step S23.

Step S26: A comparison is drawn between the total weight Xt of each body region and the body weight BW determined at the step S14 of FIG. 4A and a decision is made whether the difference xt of the plurality of measured values Xi is equal to or below a predetermined tolerance δ b. If the difference xt is above the tolerance δ b, the processing returns to the step S24 to make a height and/or horizontal-position adjustment of one or more body-region measuring units and comes back to the step S22 to repeat the weight measurement again.

Step S27: If the difference xt is below the tolerance δ b, the weight Pi of each body region set temporarily is defined as the weight of each body region and stored in the storage unit, and the separate body-region weight measurement comes to an end. The weight Pi of each body region in storage is available for a variety of succeeding analyses or the like.

The basic principle of the body-region separately weighing system according to the present invention can also be applied to little children, some elderly people and the like, though the shape of each body-region measuring unit or the like needs designing in accordance with the build of a subject.

What is claimed is:

1. A body-region separately weighing system which weighs each of six body regions of the head, trunk, right arm, left arm, right leg and left leg of a human body, comprising:
    six body-region measuring units each provided for each of the six body regions and including a supporter supporting each body region, a weighing portion right below the supporter weighing each body region on the supporter by being sent a load borne on the body-region supporter and a data transmitting-receiving portion transmitting and receiving data including body-region weight data measured by the weighing portion; and
    a data processing unit transmitting control data for weighing each body region and receiving the measured body-region weight data to and from each of the six body-region measuring units,
    wherein the data processing unit includes a means for determining each body region's weight by using the weight of a whole bod (BW) measured at an earlier stage and the measured body-region weight data, which comprises:
    a first means for acquiring a plurality of measured values (xi) and calculating an average value (Xave) and a fluctuation width (Δxi) therefor for each body region;
    a second means for deciding whether the fluctuation width (Δxi) is within a first predetermined tolerance (δa);
    a third means for temporarily setting the average value (Xave) as each body region's weight and storing it in the storage unit when the fluctuation width (Δxi) is within the first predetermined tolerance (δa);
    a fourth means for calculating the total weight (Xt) of the temporarily set weights of the plurality of body regions;
    a fifth means for deciding whether a difference between the total weight (Xt) and the weight of the whole body (BW) is within a second predetermined tolerance (δb); and
    a sixth means for defining each of the average values (Xave) as each body region's weight and storing it in the storage unit when the difference is within the second predetermined tolerance (δb).

2. The system of claim 1, wherein the plurality of body regions comprise six body regions of the head, trunk, right arm, left arm, right leg, and left leg.

* * * * *